United States Patent [19]

Gordon et al.

[11] 3,947,974

[45] Apr. 6, 1976

[54] CARDIOLOGICAL MANIKIN AUSCULTATION AND BLOOD PRESSURE SYSTEMS

[75] Inventors: Michael S. Gordon; Darrell G. Patterson, both of Miami, Fla.

[73] Assignee: The University of Miami, Coral Gables, Fla.

[22] Filed: May 23, 1974

[21] Appl. No.: 472,715

[52] U.S. Cl. ................................. 35/17; 335/206
[51] Int. Cl.² ......................................... G09B 23/30
[58] Field of Search ......................... 35/17; 335/206

[56] References Cited
UNITED STATES PATENTS

| | | | |
|---|---|---|---|
| 2,585,153 | 2/1952 | Metz | 273/126 A |
| 3,249,715 | 3/1966 | Warman | 335/206 X |
| 3,397,372 | 8/1968 | Maxwell | 335/206 X |
| 3,520,071 | 7/1970 | Abrahamson | 35/17 |
| 3,665,087 | 5/1972 | Poylo | 35/17 |
| 3,769,526 | 10/1973 | Krause | 35/17 X |

Primary Examiner—Harland S. Skogquist
Attorney, Agent, or Firm—Cooper, Dunham, Clark, Griffin & Moran

[57] ABSTRACT

A manikin system for simulating a cardiological patient is disclosed including a stethoscope with a magnet in its head which when placed on the chest of a manikin will close one or more of a number of reed switches disposed beneath the simulated skin causing an associated one of a number of stored, condition-indicating electrical signal sources to communicate the signals to an audio output for producing appropriate condition-indicating sounds. The condition-indicating electrical signals are placed in a set on the tracks of a magnetic tape to correspond to the sounds of a particular disease and the associated switch for each track is disposed at the point on the manikin chest that the particular sounds would be heard on the chest of an actual patient. The blood pressure of the manikin in accordance with the disease may also be treated by the provision of a switch in the arm of the manikin, which is connected in the manner of the chest switches, and by applying a pressure cuff in the clinical manner. A logic circuit is connected to the pressure readout for controlling the opening and closing of a relay in series with the arm switch. The logic circuit closes the relay when the pressure readout is in the range between the selected systolic and diastolic pressure levels for the disease programmed into the manikin so that when the arm switch is also closed the audio output will be operated accordingly.

15 Claims, 7 Drawing Figures

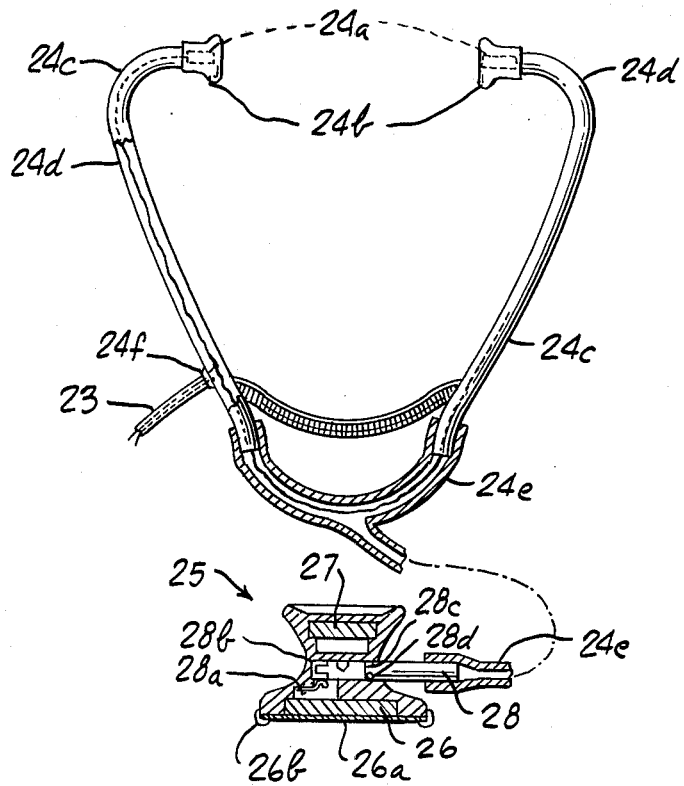
Fig. 2.
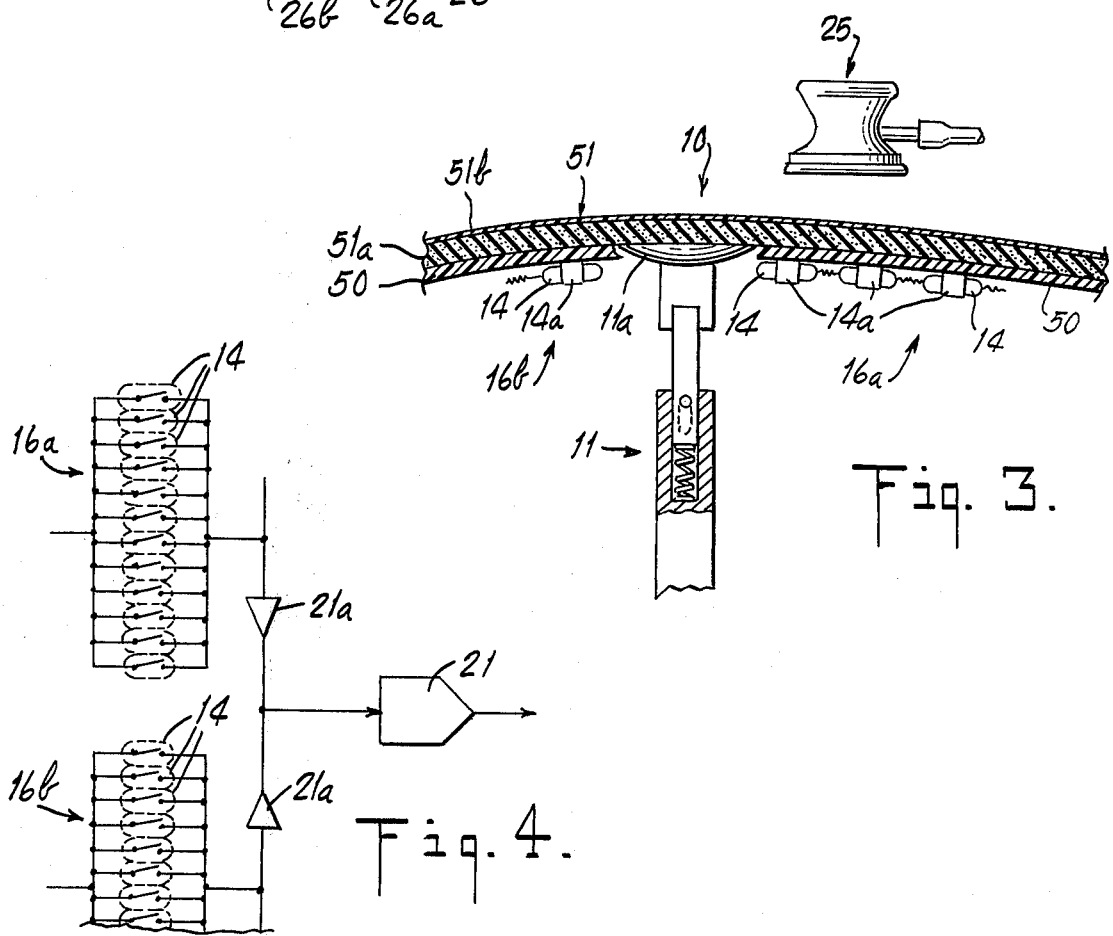
Fig. 3.
Fig. 4.

CARDIOLOGICAL MANIKIN AUSCULTATION AND BLOOD PRESSURE SYSTEMS

BACKGROUND OF THE INVENTION

The present invention relates to a medical training and evaluating simulator and, more particularly, to a cardiological system which may be used in connection with an animated manikin for teaching and evaluating medical personnel.

In order to improve the teaching of practical cardiological techniques, various types of training aids have been developed which simulate heart sounds and other physical conditions in manikins and other anatomical models. In most cases, however, the authenticity of simulation is so limited that while these devices perform a teaching function, they are poor substitutes for learning by practicing on actual patients. But even practice with actual patients has its limitations since the number and diversity of cardiological diseases to be found in a sampling of patients during a given period, even in the largest of facilities, is a small percentage of the number of known conditions. A further problem posed by this sampling situation is the difficulty of evaluating and certifying the clinical diagnostic capabilities of both students and experienced physicians over a period of time, since no objective standard of evaluation is available.

The present invention is directed to providing a cardiological training system with improved features whose authenticity of simulation and versatility permit a student to achieve a higher level of clinical training than can normally be obtained in working with actual patients, while at the same time providing an objective standard for evaluating the clinical skills of both students and experienced cardiologists. It is particularly intended for incorporation in, and to improve upon manikin systems such as disclosed in U.S. Pat. Nos. 3,662,076 and 3,665,087.

SUMMARY OF THE INVENTION

The present invention embodies a manikin system for simulating a cardiological patient including a stethoscope with a magnet in its head which when placed on the chest of a manikin will close one or more of a number of reed switches disposed beneath the simulated skin causing an associated one of a number of stored, condition-indicating electrical signal sources to communicate the signals to an audio output for producing appropriate condition-indicating sounds. The condition-indicating electrical signals are placed in a set on the tracks of a magnetic tape to correspond to the sounds of a particular disease and the associated switch for each track is disposed at the point on the manikin chest that the particular sounds would be heard on the chest of an actual patient. The blood pressure of the manikin in accordance with the disease may also be tested by the provision of a switch in the arm of the manikin, which is connected in the manner of the chest switches, and by applying a pressure cuff in the clinical manner. A logic circuit is connected to the pressure readout for controlling the opening and closing of a relay in series with the arm switch. The logic circuit closes the relay when the pressure readout is in the range between the selected systolic and diastolic pressure levels for the disease programmed into the manikin so that when the arm switch is also closed the audio output will be operated accordingly.

BRIEF DESCRIPTION OF THE DRAWINGS

FIG. 2 illustrates a stethoscope for use with the present invention with certain parts broken away to show the interior construction.

FIG. 3 is a sectional view of a portion of the manikin's chest illustrating the disposition of a pushrod and a number of reed switches.

FIG. 4 is a circuit diagram illustrating the arrangement of the sets of reed switches.

DESCRIPTION OF THE PREFERRED EMBODIMENT

Figure 1:
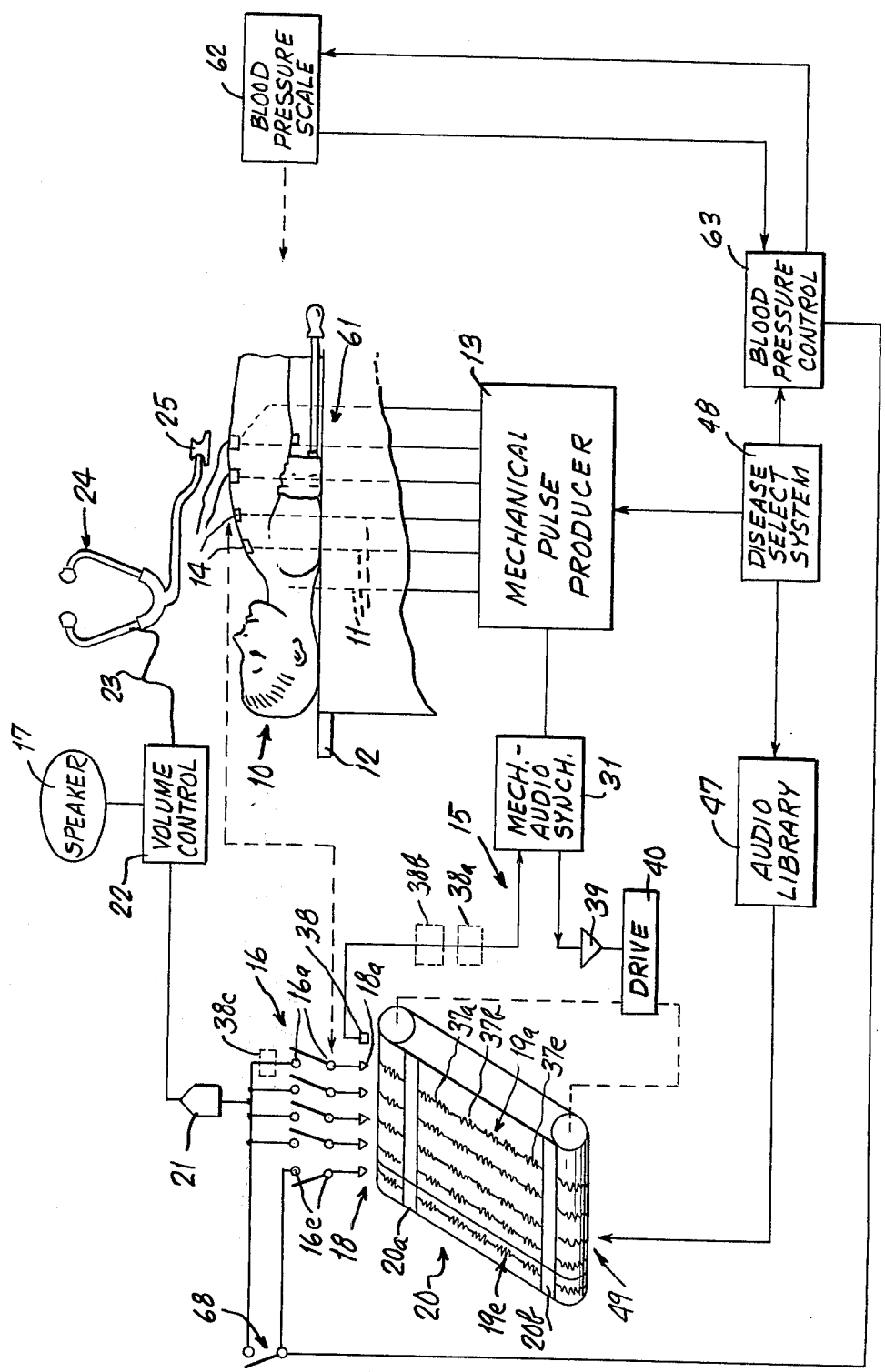
FIG. 1 illustrates a manikin system in accordance with the present invention.
Figure 5:
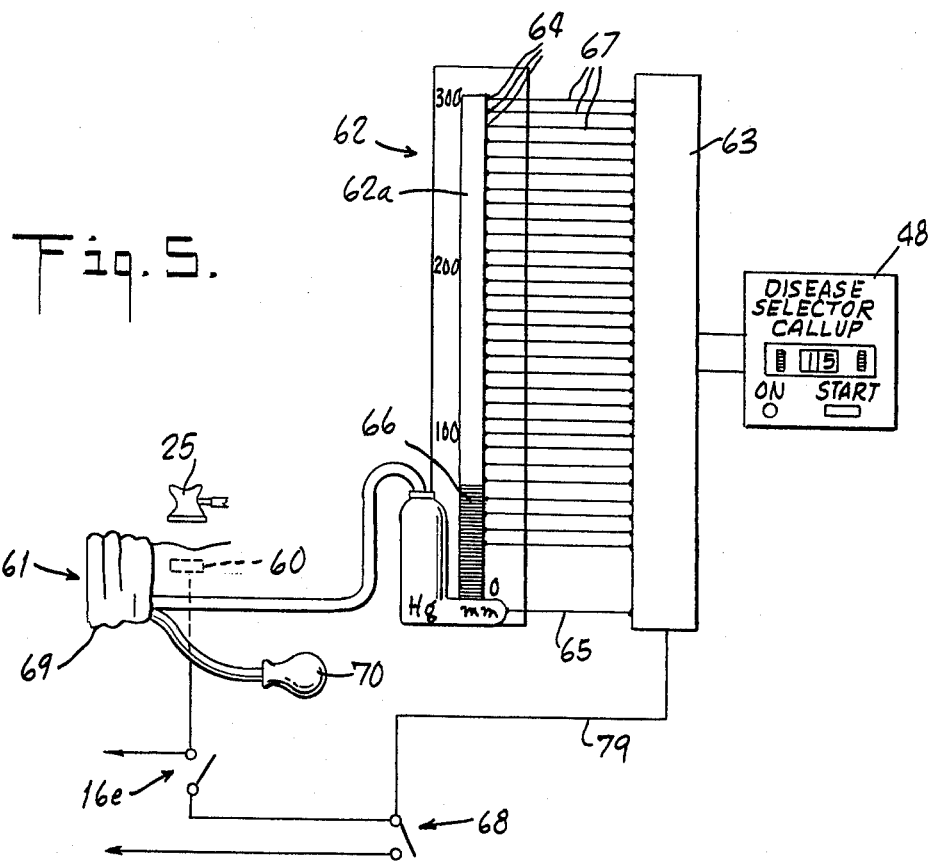
FIG. 5 illustrates the blood pressure sensing system of the present invention.

FIG. 1 illustrates one embodiment of the present invention. This embodiment is shown and will be described as incorporated in a cardiac training manikin of the type having an associated mechanical pulse-producing system such as disclosed in U.S. Pat. No. 3,662,076. Such a manikin is essentially a life-size model of a human body including at least the upper torso and head and having a hollow chest cavity covered with a simulated skin. The skin is of suitable laminated rubber and plastic, or the like, the actual construction and combination of materials being selected to give a particular life-like appearance and to be of a texture and resilience akin to human skin. A series of push rods are located in the hollow chest cavity and are moved up and down by a synchronized drive system to produce a simulated pulse action from within the skin at selected points, including the four principal chest areas for auscultation. The system may also be provided with means in the chest cavity to impress a synchronized breathing motion from within the skin.

Referring to FIG. 1, it will be seen that the manikin 10 is shown in full lines and the push rods 11 are indicated for clarity by dotted lines within the chest cavity. The manikin 10 may be mounted on a table 12 or other suitable support and the push rod drive system 13 is disposed within the support and obscured from view by a sheet or other covering. In accordance with the prior art, the manikin 10 in addition to the pulse-producing system may be provided with a series of switch means 14 positioned in the chest cavity beneath the simulated skin structure and particularly concentrated in four or more appropriate physical areas for auscultation. These switches 14 have respectively associated contacts 16 which selectively connect individual magnetic reading heads 18 to an audio amplifier 21. For example, when the rightmost contacts 16a are closed, reading head 18a couples the signal information of track 19a on recording medium 20 to amplifier 21. The recording medium 20, which may be any suitable audio means, such as a magnetic drum, tape, or disc, is driven by a suitable coupling system 15 in synchronism with the mechanical simulation drive system 13 so that the output signal 19a follows the predetermined mechanical pulse pattern of simulation. The audio signal from amplifier 21 may be coupled by line 23 through a volume control unit 22 to a stethoscope 24 and/or to an external speaker 17. In the former case, the audio signal is communicated via line 23 by an appropriate output transducer in the ears of the stethoscope 24. The signals on the various tracks 19 on recording medium 20 are coordinated with respective contacts 16 and switches 14 such that appropriate heart sound signals are communicated to the stethoscope in accordance with the auscultation area on the chest of the manikin being probed by the head 25 of the stethoscope. Different sets of heart sound signals may be successively provided on the tracks of the recording medium to simulate the sounds of different cardiac conditions.

The synchronizing coupling system 15 includes a mechanical-audio synchronizer 31 which interacts between the mechanical and audio systems to bring the heart, breathing cycle, and mechanical motions into proper time coincidence with the audio output. A suitable system for this purpose is disclosed in U.S. Pat. No. 3,769,526 wherein the basic timing cycle of the manikin is based on the fact that heart beats occur at a rate of one per second and a breathing cycle is completed in 5 seconds, so that the manikin completes one cycle in 5 seconds. By maintaining an integral number of heart beats (5) per breathing cycle, the synchronization process is simplified. Once the breathing cycle is brought into synchronism with the mechanical and audio systems, the heart sounds and motions will also be in unison. The synchronizer 31 accepts pulses produced by means of a timing cam and contacts on a mechanical master timing shaft in drive system 13 and timed to indicate the midpoints of the breathing cycles. These pulses are applied to a relay in the synchronizer 31 which is used to initiate a ramp function. The midpoint of the ramp function is set to be the correct time for the first heart sound. The audio medium 20 which contains the heart sound signals 19 also contains synchronization information 20a, 20b in the form of either pieces of foil, as illustrated, or 5 KHz subcarrier pulses which are located 5 seconds apart and correspond to the first heart sound. The five heart sounds 37a–37e on each track occur within one 5-second breathing cycle. The synchronization information 20a, 20b is read by a signal sensor 38 which is coupled to the synchronizer 31 to cause a relay to close momentarily in the synchronizer to sample the initiated ramp function. This produces a measurement in terms of voltage as to whether the audio signal is early or late with respect to the mechanical simulation system. This sample is held until the next sample comes along. The sample is applied to a voltage-controlled oscillator whose frequency is normally 60 Hz. at a voltage corresponding to that of the midpoint of the ramp function. If the sound is late, the voltage of the controlled oscillator in the synchronizer 31 is proportionately increased, and if it is early, it is proportionately decreased. Therefore after a few samples it is in time and continues to run on time at a nominal 60 Hz frequency. The heart sounds follow the speed of the voltage-controlled oscillator because its output signal is now coupled through a power amplifier 39 to drive and control a synchronous motor drive 40 of the audio medium 20. A high frequency band pass filter 38a and pulse shaper 38b are provided to remove any audio signal and shape the timing pulse fed to the relay in synchronizer 31, when the subcarrier pulses are used. Similarly a low frequency band pass filter 38c is put in the line to amplifier 21 to remove the subcarrier signal from the audio output in such instance.

The synchronizer system (31) parameters permit rapid synchronization. The time required for synchronization is random because the start of the audio medium 20 is random and synchronization can take any amount of time from 0 to about 25 seconds. When an endless medium is used containing an integral multiple of 5 seconds of length, synchronization need take place only once each time a disease is changed. Changing of a disease may be accomplished, for example, by either replacing particular medium tapes, which may be in the form of cartridges or cassettes, or by erasing the medium and rewriting using an audio library system such as described in U.S. Pat. No. 3,665,087. In a preferred embodiment for use with the present invention, an audio library 47 is developed comprising a number of tape cartridges, each provided with a set of audio tracks containing the related auscultation sounds for a particular cardiac disease. The cartridges may be mounted in groups of twenty four on carousel-type turntables for presentation to the reading heads 18. A disease select system 48 controls the selection of a particular disease and the appropriate tape cartridge is rotated into reading position while a coordinated signal is sent to the mechanical pulse producer 13 setting the proper push-rod motion program therein. The acquisition time described above will in most instances synchronize a new medium before the mechanical system has completed its change to the new selected illness.

The foregoing description is essentially of suitable systems of the prior art with which the present invention may be used, but it will be seen that other analogous systems may be substituted therefor or new systems developed which will be found to be equally compatible. In any event, the present invention involves the combination of a stethoscope and sensing switch system of simplified construction which may be used with cardiac training manikins of the above-described type or any alternate type having a suitable associated heart sound producing system. The stethoscope has a pickup head provided with means for creating a magnetic field for coupling to the auscultation areas in the manikin body. Hermetically-sealed proximity switches, such as magnetically actuated reed-type switches, are located under the manikin skin structure and are activated by the magnetic field when the stethoscope head is placed on the manikin's skin. One or more reed-switches are closed by the proximity of the magnetic field means developing a continuity link in the sound circuit to produce the desired aural output in the stethoscope earpieces and/or a separate speaker.

STETHOSCOPE AND SENSING SYSTEM

The details of a stethoscope and switching system in accordance with the present invention for selecting the suitable audio channel to be connected to output transducers in a stethoscope ear piece will now be described with reference to FIGS. 2–4. The stethoscope 24 is of the standard clinical type used by cardiologists and is easily modified to include the necessary systems. For example, as shown in FIG. 2, miniature earphone modules 24a, such as those sold commercially as Magna-Tone No. 10210G-1000, may be incorporated in the plastic earpieces 24b, of a Tycos-Harvey stethoscope or the like. The earphones are connected, such as by No. 28 AWG conductor multistrand twisted wire pairs 24c, to the volume control 22 of the audio system of FIG. 1. The wire pair 24c may be run to volume control 22 from either the metallic earpiece support arm 24d, or the rubber conductor tube 24e, through ⅛-inch maximum O.D. vinyl heat-shrink tubing 23. The tubing 23 may contain 80 pound test leader and also act as a lanyard for permanently connecting the stethoscope 24 to the manikin unit 10 to avoid its being misplaced.

The stethoscope pickup head 25 is preferably adapted to internally contain magnetic field producing means in the form of two suitable magnets, 26 and 27, while maintaining its conventional outward appearance. The magnets 26 and 27 may be permanent magnets with an adequate gauss density, for example, of approximately 4 pound pull. The diaphragm side of the pickup head 25 may contain a 1 ¼ inch diameter by 3/16-inch thick permanent magnet 26 preferably held in the counter bore by a diaphragm 26a and compression ring 26b. The bell of the stethoscope head is preferably fabricated from Armco magnetic iron and counterbored for a ¾-inch diameter by ¼-inch thick 4-pound magnet 27. Armco iron is preferred for its excellent permeability and flux density enhancement since the bell configuration does not allow the magnet 27 to be as closely positioned with respect to the manikin skin as the magnet 26 on the diaphragm side. The pickup head 25 is mounted for rotation through 360°, depending on the user's needs, on conductor tube trunnion 28 and a steel leaf spring 28a contacts detents 28b, on the trunnion, which are disposed 180° in relationship enabling a positive positioning of the head 25 with respect to the conductor tubing 24e. The trunnion shaft 28 is grooved at 28d to receive a retaining roll pin 28d that holds the trunnion and head together. The Armco iron bell assembly is attached to the diaphragm/trunnion assembly by threaded engagement confining the magnet 27 in place.

The earphone transducers 24a may be assembled in each plastic earpiece 24b and secured by RTV silicon rubber. The audio signal input conductors 24c from volume control 22, as mentioned, may be of No. 28AWG stainless steel or other suitable conductive material and vinyl covered. The two wires may be run to the transducers 24a within the metallic eartube conductors 24d as shown, or a small ring 24f may be silver brazed on one metallic eartube conductor 24d and one of the wires grounded to it. To facilitate attaching the security lanyard to the stethoscope, the leader may also be silver soldered to the ring 24f. The other conductor wire is the positive lead of the audio circuit and it is passed through the security ring 24f and then may be spliced and connected to the positive leads of the earphone transducers 24a inside the metallic tube assembly 24d.

The switching system for use with stethoscope 24 is disposed within the auscultation areas in the manikin body and comprises an array of normally-open, reed-type, magnetically-actuated proximity switches 14 that are interconnected in sets of parallel circuits, 16a, 16b, etc., (FIG. 4) through audio preamplifiers 21a to power amplifier 21. The quantity and location of the reed switches 14, which are attached to the manikin's substructure, determine the active sensing audio areas for the respective heart sounds. As seen in FIG. 3 the chest or thoracic cage of the manikin 10 consists of a solid substructure 50, such as fiberglass, formed to the desired shape and covered with skin 51 which may be of foam rubber 51a with a suitable layer 51b of plastic or rubber on the outer surface. Openings are provided in the substructure 50 such as at 50a, to permit the heads 11a of the push rods 11 to directly engage the skin 51.

The proximity switches 14 are precisely positioned on the substructure 50 to be activated by the magnetic field, so that the contacts close when the stethoscope head 25 is in intimate contact with the external chest surface of the manikin. The switches 14 are held in place by nonferric clips 14a and secured to the clips with Epoxy after final positioning. They may be positioned immediately around the mechanical pulse-producing push-rod head 11a and may be of a type commercially obtainable from Hamlin Inc. under Prod. No. MMRR-2-185.

The use of magnetic field coupling for closing the switches is an improvement over prior systems, such as disclosed in U.S. Pat. NO. 3,665,087, since it eliminates the need for an electrical input signal to the stethoscope which requires an especially large radio frequency conductor and noticeable modification of the conventional stethoscope structure. In addition the operational reliability is greatly improved over this prior art since it obviates the need for the presently-used 100 percent pure silver impregnated rubber in the skin which has a very low functional life due to the silver particulate migration which creates conduction voids in the rubber caused by the manikin chest wall palpitations constantly flexing the rubber material. The need for a very thin skin layer over the pickup areas to establish the RF link between the pickup areas and the stethoscope head transmitter is also eliminated. It further permits the stethoscope head to be readily rotated in the normal manner for cardiological examination.

BLOOD PRESSURE SENSING SYSTEM

To add to the training capabilities and to further patient simulation, the manikin may also be provided with a blood pressure sensing system. Referring again to FIG. 1, the simulated blood pressure system may comprise: a switch, or series of switches, 60 of the reed-type, suitably disposed in the arm of the manikin 10; the above-disclosed stethoscope 24 and audio system; a blood pressure measuring and indicator system 61, 62; and an electronic control assembly 63. The blood pressure measuring and indicator system 61, 62, may be a conventional sphygmomanometer so that it and the stethoscope 24 will both have the external appearance of typical clinical apparatus. However, the mercury manometer indicator tube 62a in the sphygmomanometer is provided on the rear surface with a series of electrical contacts 64 that are connected to the blood pressure electronic control assembly 63. The electronic control assembly 63 also receives an input from the disease select system 48 and has an output 79 connected to a relay or microswitch 68. The relay 68 is connected in series with the associated contacts 16e of switch 60. Thus when switch 60 is actuated by the stethoscope head 25, contacts 16e are closed and if then relay 68 closes, the appropriate audio signals are fed from the medium 20 to the audio system connected to the earpiece transducers in the stethoscope 24.

The electronic control assembly 63 comprises a disease discriminating logic memory which establishes appropriate blood pressure combinations in response to the input from the disease select system 48. A positive logic TTL-circuit senses the level of the mercury in the manometer tube 62a and controls the output of blood pressure aural sounds to the stethoscope. For example, in the embodiment shown there are 15 disease combinations, hence thirty contacts 64 are provided to sense the systolic and diastolic parameters in the manometer tube 62a.

Figure 7:
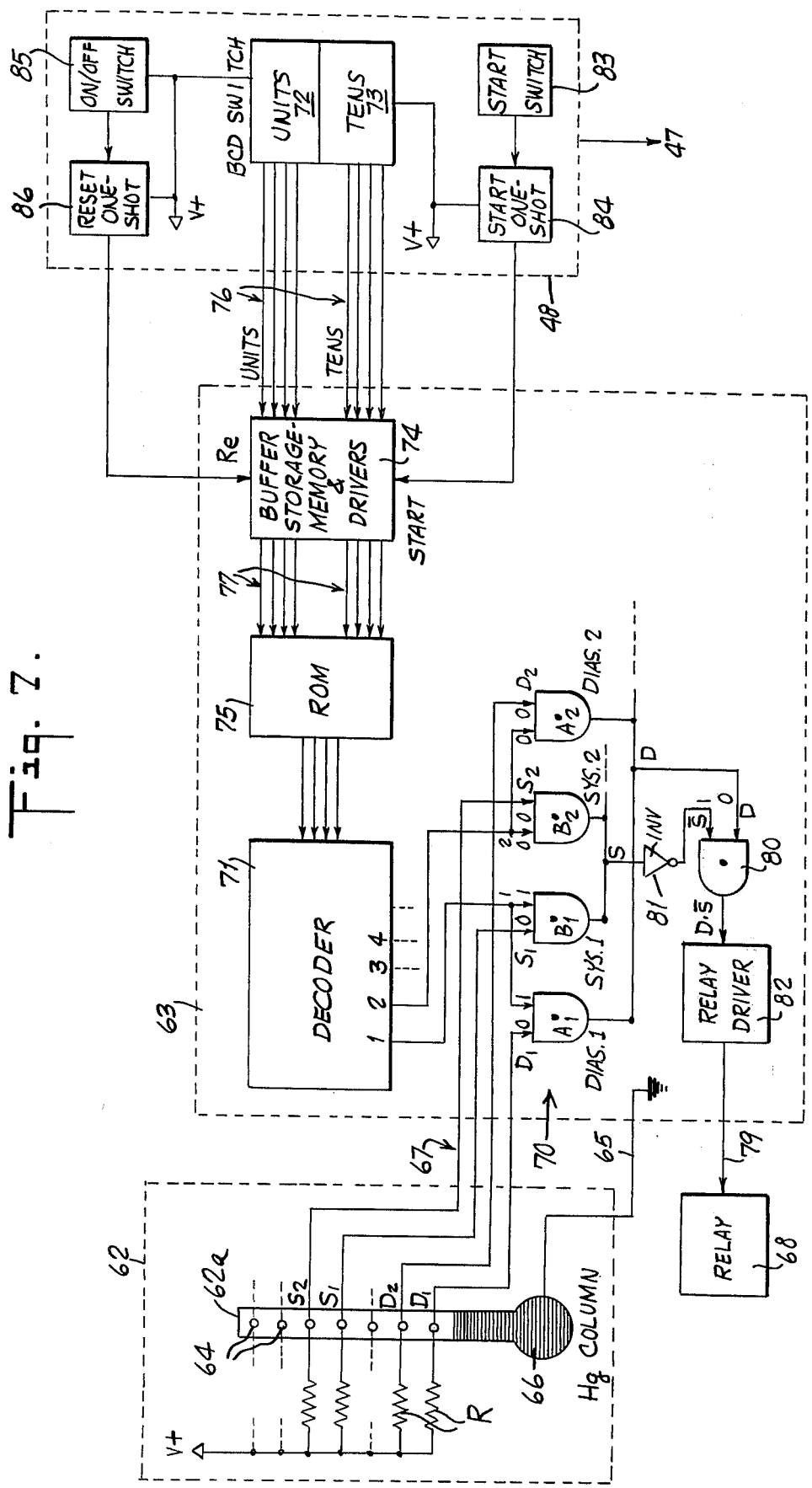
FIG. 7 is a diagrammatic illustration of the blood pressure system logic circuit components.

As seen, more particularly, in FIG. 7 each of the contacts 64 is connected through a resistor R to a voltage source V+ which may be, for example, a 5 volt DC source. Each of the contacts 64 is also connected through its lead 67 to a logic circuit 70 in the electronic control system 63. The logic circuit 70 comprises an array of 30 AND gate elements $A_1$, $B_1$, $A_2$, $B_2$, etc., each having an input from one of the contacts 64. However, any particular contact 64 may provide an input to more than one of the gate elements. The other input of each gate element is applied from a binary to 1 of 16 decoder 71 in such manner that the first two adjacent gate elements $A_1$, $B_1$ are both connected to the first output line of the decoder 71, the next two adjacent gate elements $A_2$, $B_2$ are both connected to the second output line and so on for 15 of the 16 output connections. The output of the decoder 71 is programmed to establish a characteristic responsive diastolic and systolic pressure in the logic circuit in accordance with a disease set on the disease select system 48.

More particularly, the disease select system 48 comprises two binary coded decimal (BCD) switches 72, 73, each capable of applying four lines of BCD data. The characteristic diastolic and systolic pressures for a particular disease may be selected by dialing a preassigned number in terms of units and tens on the two switches 72, 73 whose output is applied through a buffer storage-memory and driver unit 74 to a read-only-memory (ROM) unit 15. The ROM unit 75 is programmed to output a binary code which is indicative of the blood pressure combination for the particular disease which has been dialed on the BCD switches. These two values are fed to the decoder unit 71 for application to the AND gate array 70. For example, all of the outputs from the decoder 71 maintain their respective inputs on the AND gate pins at logic "0". When the input from the ROM unit 75 is applied to the decoder unit 71, the decoder output line corresponding to the binary code will reset the two inputs to its respective AND gate elements to logic "1". Each set of AND gates contains a gate element A representing the diastolic pressure and a gate element B representing the systolic pressure of the disease for which they have been programmed by connection to the particular decoder output line. This is achieved by wiring the other input of the diastolic gate element A to the contact 64 at the appropriate pressure level on the signal manometer tube 62a and by wiring the input of the other gate element B to the contact 64 corresponding to the systolic pressure level on the tube 62a. These inputs will normally be maintained at logic 0 but will switch to logic 1 when the mercury column in the tube 62a reaches the level of the respective contact 64.

The outputs of all of the diastolic gates A are connected to one input of a further AND gate 80. The other input of the AND gate 80 is connected through an inverter 81 commonly to the outputs of all of the systolic gates B. Thus, normally the diastolic input to the AND gate 80 will be at logic 0, and the systolic input will be at logic 1. The output of the AND gate 80 operates a relay driver 82 which closes the relay 68 in the audio circuit.

In operation, when the system is started up by the actuation of a start switch 83 in the disease select system 48, a one-shot multivibrator 84 generates an initiate or "start" signal. This signal sets up the subsystems in the buffer storage-memory and driver unit 74 to accept the data on the input lines from the BCD switches 72, 73 and sets up the conditions preprogrammed in the ROM unit 75 so that the buffer storage is updated. The setting of the BCD switches provides input data which consists of two sets of four bits representing the code 1-2-4-8 and 10-20-40-80. This data is applied over line 76 to the inputs of the buffer storage in unit 74 and upon the generation of the start signal is stored in the buffer storage. Thus the data on the data lines 76 feeding the subsystems in unit 74 is held steady except when start is generated, accordingly eliminating the danger of data changes caused by inadvertent shifting of the BCD switches 72, 73. A system reset one-shot multivibrator 86 is also provided which operates only at the time when the power is turned on with the on-off switch 85 and acts to bring all the systems back to the 0 state or basic condition each time the power is turned on.

The data stored in the buffer storage is applied to the line drivers (buffer amplifiers) in unit 74 to drive the data lines 77 to the ROM unit 75. The ROM unit 75, in accordance with its program, provides a binary coded output to the decoder 71 indicative of the blood pressures for the disease set on the BCD switches 72, 73. The decoder 71 in turn sends a signal over its appropriate output line resetting the respective gate elements A and B to logic 1. It will then be seen that all of the elements in gate array 70 will have both inputs at logic 0 with the exception of the two elements associated with the activated decoder output line. For example, as seen in FIG. 7 if decoder output 1 is activated, then elements $A_1$ and $B_1$ will have their inputs at logic 0 and logic 1. The outputs of all the AND gates A and B will still be at logic 0. The system is now ready to provide an appropriate blood pressure reading.

Figure 6:
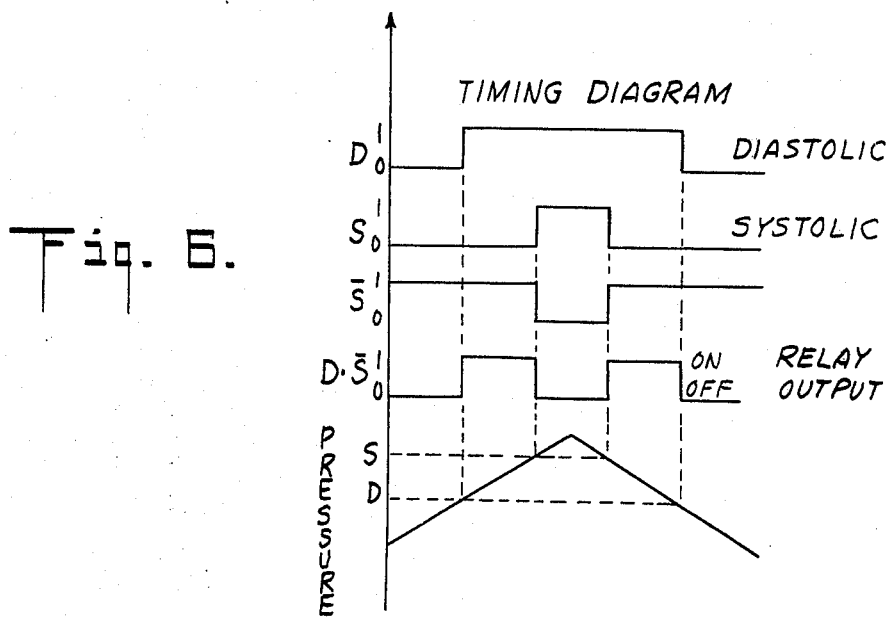
FIG. 6 is a timing diagram of the blood pressure system operation.

FIG. 6 is a timing diagram of the blood pressure system operation. As the pressure in pressure cuff 61 increases, the column of mercury 66 in tube 62a will begin to rise accordingly. When the column reaches the level of the particular contact 64, whose lead is connected to the other input of diastolic gate element $A_1$, this input will be switched from its normal state at logic 0 to logic 1. Both of the inputs of AND gate $A_1$ will then be at logic 1, so that its output will switch from its normal state at logic 0 to logic 1. Accordingly, the input D will be switched to logic 1 so that AND gate 80 output $D.\overline{S}$ will switch from normal logic 0 to logic 1. The AND gate 80 output will then actuate the relay driver 82 closing relay 68 so that if the reed switch 60 in the manikin arm has previously been activated by the stethoscope head 25, the audio circuit will be closed and the appropriate audio signal will then be communicated to the stethoscope ear pieces 24b or the external speaker system 17.

The audio signal will continue as long as the cuff pressure and the mercury column 66 continue to rise until the column reaches the level of the particular contact 64 connected to the other input of systolic gate element $B_1$. At this point the other input to gate $B_1$ switches from normal logic 0 to logic 1. With both its inputs at logic 1 gate element $B_1$ switches its output from normal logic 0 to logic 1. This output is passed through inverter 81, switching the input $\overline{S}$ to gate element 80 to logic 0. With its inputs now at logic 0 and logic 1, AND gate 80 switches its output from logic 1 to logic 0. Relay 68 will then be deactivated cutting off the audio signal to the stethoscope as long as the mercury column is at or above the systolic pressure level.

If the pressure in cuff 61 is then released, the mercury column will begin to fall and when it drops below the level of the contact 64 connected to the input of systolic gate $B_1$, the gate input will be switched from logic 1 back to logic 0. The output of gate element $B_1$ will then be switched from logic 1 back to logic 0, and the inverted input $\bar{S}$ to AND gate 80 will switch from logic 0 back to logic 1, in turn switching AND gate 80 output $D.\bar{S}$ from logic 0 to logic 1. Relay 68 will again be activated closing the audio circuit. The audio signal will accordingly again be heard in the stethoscope ear pieces 24b when the pressure drops below the systolic level. As the pressure and mercury column 66 continue to drop, the diastolic level will be reached, and the output of diastolic gate element $A_1$ (D) will be switched to accordingly deactivate the relay 68 cutting off the audio signal when the pressure is below the diastolic level.

It will thus be seen that if the mercury column 66 in the tube 62a is in coincidence with or between the programmed active systolic and diastolic pressure contacts, the aural blood flow sound may be sent to the earpiece transducers by having the TTL circuitry close the relay 68 which is in series in the audio system with contacts 16e, controlled by the magnetically actuated proximity switch 60 located in the manikin arm. If the magnetic head 25 on the stethoscope 24 is maintained in the normal brachial artery monitoring position, the proximity switch 60 and contacts 16e which are normally open will be closed by the magnetic coupling so that when the position of the mercury column 66 closes the switch 68, the appropriate continuously playing audio signal on the audio medium 20 will have a direct path through the amplifying system 21 to the transducers 24a in the stethoscope earpieces 24b. All sounds from the audio medium 20 will be synchronized with the mechanical palpitations since the medium 20 has been synchronized with the mechanical system 13 by the mechanical-audio synchronizer system 15 previously described.

As an alternative to the manometer tube 62 an aneroid indicator may be used and the blood pressure readout may be by an inductive, capacitive or contact brush coupling which converts the mechanical indication of the dial pointer to an eledtrical value. Also a linear pressure transducer in a parallel pressure system may be used by interfacing an A–D converter commercially available. These pressure sensing states can sense the dial read-out pressure. A simple electronic circuit may be used to interface with the TTL circuitry.

It will also be seen by those skilled in the art that this simulated blood pressure system need not be incorporated in the described cardiac manikin, but may find independent use for training paramedical personnel using merely the model of a limb or other simulation device.

MANIKIN OPERATION

Turning now to the operation of the various systems incorporated in the manikin as used in an integrated training program for students of cardiology, the appropriate aural sounds for any desired number of cardiac diseases may be stored in the previously-mentioned audio library 47. One disease will have the appropriate sounds for the four or more major auscultation points on the manikin chest cavity stored on four associated audio tracks and the related blood pressure sounds may be stored on a fifth associated track or in view of existing recording tape technology on a separate but synchronized audio subsystem which may also contain appropriate signals for indicating other pathological data such as radiating murmurs, bruits, and breathing sounds. The setting of the disease select system 48 selectively operates the tape storage turntable to insert a tape cartridge from the library 47 in the place of medium 20. The particular set of audio signals on medium 20 may thus be readily selected and changed under the control of the disease select system console 48 by merely dialing a disease select number without any handling of the audio elements. In this manner it is relatively easy for one to rapidly select from the library one of many diseases and learn the proper audio signals that should emanate from a particular location under auscultation on the manikin in a realistic and accurate manner.

When a particular disease has been set on the disease select system, the mechanical palpitation system 13 will be set accordingly for appropriate operation and the appropriate aural information will be inserted in the place of the audio medium 20. The mechanical-audio synchronizer system 15 will then cause all of the simulation systems within the manikin to operate in synchronism. The manikin is then ready for examination.

When the student places the head 25 of the stethoscope 24, containing the appropriate magnets, in intimate contact with the chest skin of the manikin, in proximity to one of the four major auscultation areas, the magnetic field of the magnet will cause one or more of the reed switches 14 in the closest microswitch system 16a, b, etc., to close, feeding the appropriate audio signal from the associated tape track 19a, b, etc., through the amplifier 21 and volume control 22 to the output transducers in the stethoscope earpieces and/or to the speaker 17. When the stethoscope head 25 is placed precisely on the proper auscultation point a maximum number of reed switches 14 will be closed and the volume of the audio signal reaching the earpiece transducers will be maximized. The student may thus gain practice in proper positioning of the stethoscope head as the switching arrangement will be direction and pressure sensitive.

The blood pressure of the patient manikin may be taken by placing the stethoscope head in the vicinity of the brachial artery in the manikin limb causing switch 60 to close. The closing of switch 60 will not automatically feed the appropriate audio signal to the earpiece transducers since relay 68 is normally open. Since relay 68 closes only in response to the movements of the mercury in the sphygmomanometer, or the pressure indicator dial on alternative pressure-reading apparatus, it will be necessary to pump up the pressure in the cuff 69 on the manikin limb using the bulb 70. Then upon the closing of relay 68 appropriate audio signals will be fed to the stethoscope in accordance with the disease settings in the control system 63 from select system 48.

Synchronized palpitations will be continuously produced in the manikin's chest and other desired areas while the auscultation and blood pressure sounds are being investigated. It is a particular advantage of the present system that any mechanical sounds within the manikin chest cavity will not interfere with the audio system since the only audio system components in the chest cavity are the microswitches which do not interfere with any of the mechanical movements and leave a maximum amount of room for the incorporation of other systems within the manikin interior.

We claim:

1. A medical simulation apparatus of the type comprising:
    a. means for simulating an anatomical member;
    b. stethoscope means for examining said simulating means and having a contacting head for application to said member simulating means;
    c. audio output means for producing an audio signal in response to an electrical signal; and
    d. means for storing condition-indicating electrical signals for communication to said audio output means;
    e. means in the head of said stethoscope means for producing a magnetic field; and
    f. switch means within said member simulating means responsive to the proximity of said magnetic field for communicating the stored condition-indicating electrical signals to said audio output means; and wherein said member simulating means comprises an arm and said switch means comprises a first switch disposed in the region of the brachial artery and further comprising means for blood pressure testing comprising:
    g. an inflation cuff means for application to said arm;
    h. pressure-indicating means for indicating a pressure in said cuff means;
    i. means for sensing the pressure indication of said pressure-indicating means;
    j. a second switch operatively connected in series with said first switch; and
    k. control means for operating said second switch in response to the sensing of given pressure indications by said pressure-indication-sensing means.

2. Apparatus as in claim 1 wherein said stethoscope means comprises two earpieces and said audio output means is disposed in said earpieces.

3. Apparatus as in claim 1 wherein said stethoscope means comprises a cardiological stethoscope having a head including a bell portion and a diaphragm portion, and said means for producing a magnetic field comprises two permanent magnets, one disposed in said bell portion and one disposed in said diaphragm portion.

4. Apparatus as in claim 1 wherein said switch means comprises a set of reed switches operatively connected in parallel.

5. Apparatus as in claim 1 wherein said member simulating means further comprises means for simulating a resilient layer of skin and substantially rigid substrate means for supporting said skin means, and wherein said switch means is disposed on the opposite side of said substrate means from said skin means.

6. Apparatus as in claim 1 wherein said member simulating means further comprises a chest cavity, said storing means stores a plurality of cardiac-condition-indicating electrical signals and said switch means further comprises a plurality of sets of switches, the switches in each set being operatively connected in parallel with each other, and each set being disposed in said chest cavity at a different auscultation area, and said switch means communicates one of the plurality of said electrical signals to said audio output means.

7. Apparatus as in claim 6 wherein said storing means comprises means for storing coordinated sets of cardiac-condition-indicating electrical signals corresponding to the simultaneous audio signals occurring at said different auscultation areas for respective communication to said audio output means through said respective sets of switches.

8. Apparatus as in claim 1 wherein said pressure-indicating means comprises a mercury column and said sensing means comprises a series of contacts disposed along the path of said mercury column and each operatively connected to said control means.

9. In a training device of the type used in simulating cardiac conditions comprising:
    a. a manikin having at least a chest cavity and arms with resilient skin thereon;
    b. mechanical means for producing a timed pulse-like action on the surface of said manikin;
    c. audio means for producing cardiac-condition-indicating sounds comprising:
        i. means for storing cardiac-condition-indicating electrical signals; and
        ii. audio output means for producing cardiac-condition-indicating sounds in response to said cardiac-condition-indicating electrical signals; the improvement comprising:
    d. switch means for selectively communicating said cardiac-condition-indicating electrical signals to said audio output means and comprising a plurality of reed switches disposed in said manikin beneath said resilient skin at selected areas for examination on said chest cavity including at least a first switch in one of said arms;
    e. stethoscope means for actuating said switch means to control the sounds produced by said audio means and comprising a contacting head having means therein for producing a magnetic field for actuating said switch means when brought into contact with said manikin skin adjacent thereto; and
    f. means for simulating blood pressure testing comprising:
        i. means for indicating a test pressure applied to said one arm having said first switch therein;
        ii. means for sensing the pressure indication of said pressure-indicating means;
        iii. a second switch operatively connected in series with said first switch; and
        iv. control means for actuating said second switch in response to the sensing of given pressure indications by said pressure-indication sensing means.

10. A device as in claim 9 wherein said resilient skin comprises a layer of resilient material and further comprising substantially rigid substrate means for supporting said layer of resilient material, and wherein said switch means is disposed on the opposite side of said substrate means from said layer of resilient material.

11. A device as in claim 9 wherein said electrical signal storing means comprises means for storing a plurality of sets of coordinated cardiac-condition-indicating electrical signals, each set corresponding to audio signals which occur simultaneously at the selected areas for examination indicative of a particular cardiac disease.

12. A device as in claim 11 further comprising
    g. means for selecting a set of said electrical signals for communication to said audio output means; and
    h. means responsive to said selecting means for synchronizing said mechanical means and said electrical signal storing means such that the timed pulse-like action on the surface of said manikin is coordinated with the cardiac-condition-indicating sounds produced by said audio output means.

13. A device as in claim 9 wherein said cardiac-condition-indicating electrical signals are communicated from said storing means to said audio output means when said first switch and said second switch are both closed.

14. A blood pressure testing simulation device comprising:
   a. means for simulating at least a portion of a human arm;
   b. means for applying a test pressure to said arm means;
   c. means for indicating said test pressure;
   d. means for sensing the pressure indication of said indicating means;
   e. means for producing blood pressure sounds;
   f. switch means disposed in said arm means in the region of the brachial artery and responsive to the proximity of a magnetic field for producing an output condition when a magnetic field is proximate;
   g. stethoscope means, having means in its head for producing a magnetic field, for actuating said switch means to produce the output condition when its head is brought into contact with said arm means in proximity to said switch means; and
   h. control means for actuating said sound-producing means in response to the sensing of given pressure indications by said sensing means when said output condition is present.

15. A device as in claim 14 wherein said switch means comprises a first switch connected in circuit with said sound-producing means and said control means comprises a second switch in series with said first switch and means for actuating said second switch in response to the sensing of given pressure indications by said sensing means.

* * * * *

UNITED STATES PATENT AND TRADEMARK OFFICE
CERTIFICATE OF CORRECTION

PATENT NO. : 3,947,974
DATED : April 6, 1976
INVENTOR(S) : MICHAEL S. GORDON & DARRELL G. PATTERSON It is certified that error appears in the above-identified patent and that said Letters Patent are hereby corrected as shown below:

Abstract, line 17, change "treated" to --tested--;

Col. 8, line 11, "except when start is generated," should read --except when "start" is generated,".

Signed and Sealed this

Tenth Day of August 1976

[SEAL]

Attest:

RUTH C. MASON
Attesting Officer

C. MARSHALL DANN
Commissioner of Patents and Trademarks